Patented June 17, 1941

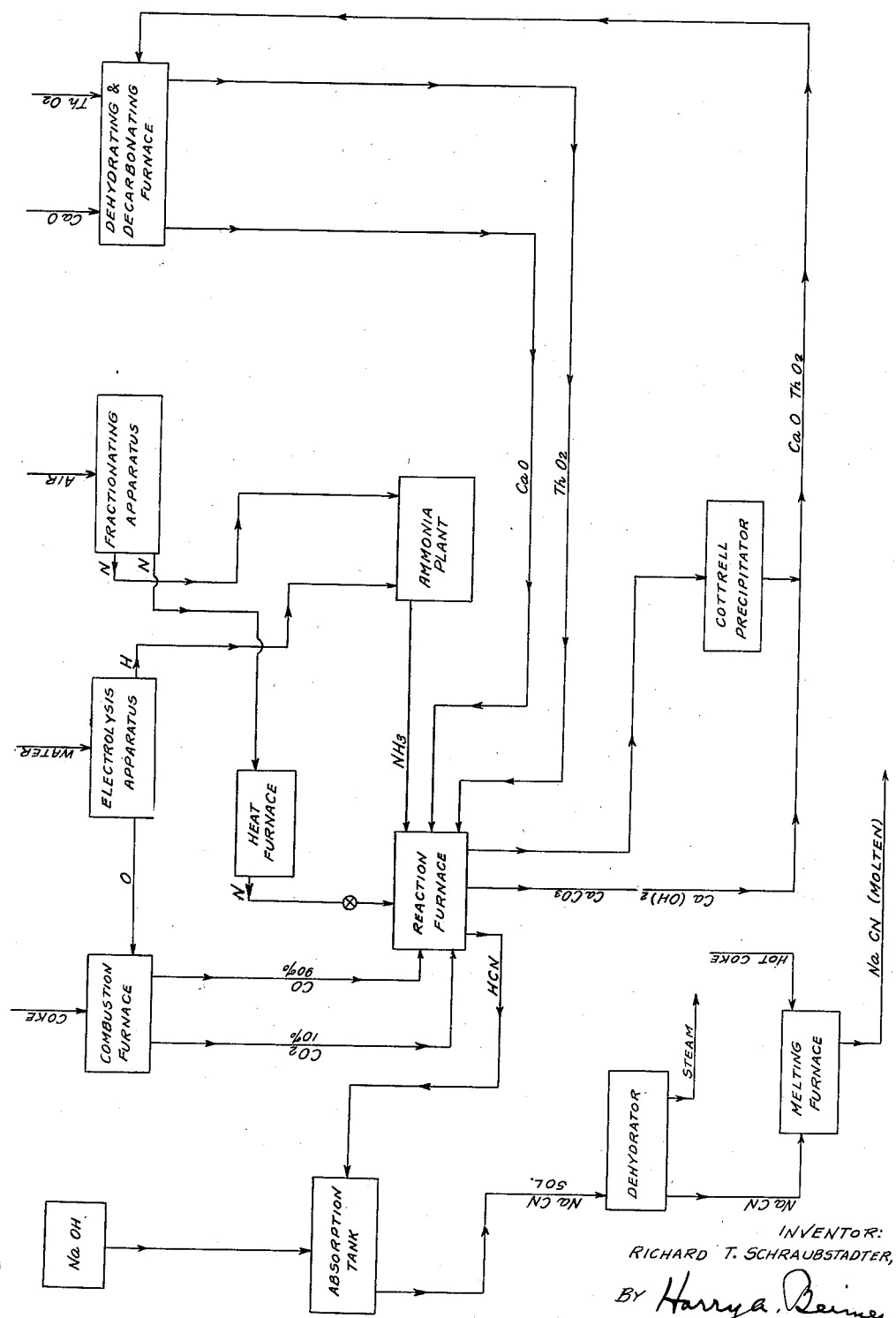

2,246,014

UNITED STATES PATENT OFFICE 2,246,014

METHOD OF PRODUCING HYDROCYANIC ACID AND SALTS THEREOF

Richard T. Schraubstadter, University City, Mo.

Application June 3, 1939, Serial No. 277,170

3 Claims. (Cl. 23—151)

My invention has relation to improvements in methods of manufacturing hydrocyanic acid and salts thereof, and consists of the novel features set forth in the specification and pointed out in the claims.

My improved method contemplates the synthesis of hydrocyanic acid through the agency of carbon monoxide and ammonia with the embodiment of means for taking up the steam resulting and the $CO_2$ in the reaction, whereby a considerable economy is effected in the quantity of materials used.

A further object of the invention is to cause the combination of carbon monoxide and ammonia in the presence of a suitable catalyst, and also a material such as calcium oxide for which the moisture in the form of steam has a stronger affinity than it has for carbon monoxide. The presence of lime during these reactions also prevents the combination of carbon dioxide with ammonia (as the $CO_2$ combines with the CaO in the presence of moisture) and thus assures an economy of operation.

Other advantages of my improved process will be better apparent from a detailed description of the same in connection with the accompanying flow-sheet which indicates various apparatus utilized in one arrangement of the process.

Oxygen and hydrogen are obtained by the electrolysis of water, the oxygen passing into a combustion furnace having previously been charged with coke, and the hydrogen passing to an ammonia plant. Nitrogen is obtained by fractionating air, some of which nitrogen is passed to the ammonia plant and some of it in the initiation of the process being conducted to a heating furnace where its temperature is raised to approximately 450° centigrade. After the process is started and prior to the main reactions the nitrogen flow from the heating furnace is discontinued.

Quicklime and thoria are charged into a suitable dehydrating and heating furnace to insure the expulsion of all moisture and obtain the proper temperature, after which the lime and thoria are fed into the reaction furnace which has previously been heated by nitrogen. The flow of hot nitrogen to the reaction furnace is cut off as soon as the temperature thereof has been brought up to the desired point (between 420° to 450° C.) for the most satisfactory results.

Carbon monoxide and, of course, some carbon dioxide from the coke combustion furnace are now conducted into the reaction furnace, as is also ammonia from the ammonia plant and calcium oxide and thoria from the dehydrating and heating furnace. The lime and thoria are injected in finely powdered form with the gases, and after reactions the resultant lime compounds (calcium hydroxide, calcium carbonate and some calcium oxide) fall to the bottom of the furnace, as also does some of the thoria, whence they are subsequently removed. During the reactions the furnace temperature is maintained between 400° and 450° for most efficient results. The finer particles of solids are carried with the gases into a precipitation chamber where they are precipitated by a Cottrell electric separator, as well known in the art.

The chemical reactions occurring in the reaction furnace are as follows:

No. 1. $NH_3 + CO \rightarrow$
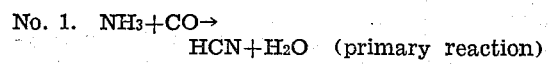
$HCN + H_2O$ (primary reaction)

The formation of water is ordinarily objectionable as it combines with carbon monoxide to produce carbon dioxide and hydrogen, according to the formula:

No. 2. $CO + H_2O \rightarrow$
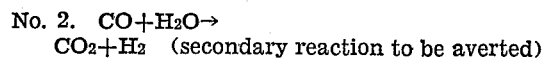
$CO_2 + H_2$ (secondary reaction to be averted)

The presence of lime during the synthesis of the hydrocyanic acid removes the water which is in the form of steam, in this manner:

No. 3. $CaO + H_2O \rightarrow Ca(OH)_2$ (secondary reaction which is substituted for No. 2)

The carbon dioxide that is present in the reaction furnace is also acted upon by the lime in the presence of moisture to produce calcium carbonate.

Combining the above reactions, we find that the chemistry of the process may be expressed by the following representative formula:

No. 4. $9CO + CO_2 + 9NH_3 + 11CaO \rightarrow$
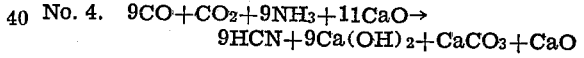
$9HCN + 9Ca(OH)_2 + CaCO_3 + CaO$ The hydrocyanic acid produced in the reaction furnace may be fed into a saturated solution of caustic soda in the production of sodium cyanide which is subsequently dehydrated and charged into a melting furnace from which the molten sodium cyanide is obtained.

The solids that are obtained from the reaction furnace may be returned to the dehydrating and decarbonating furnace where the lime compounds revert to oxides, whereupon the lime and the thoria are ready for reaccession in the process.

From the foregoing it is apparent that great economy in materials is effected by the use of lime oxide and it will be obvious to those skilled in the art that the accession of lime oxide is both feasible and beneficial in any reaction whereby hydrocyanic acid and steam are evolved.

In summing up, it is apparent that my improved process provides means for effectively checking the reaction of steam with carbon monoxide, thus assuring a minimum requirement of reagents.

By obtaining oxygen through the electrolysis of water the hydrogen required for the process is simultaneously produced for synthetic production of the complementary ammonia. Some hydrogen may also be obtained as a by-product if the alkali or caustic alkali used in the process is obtained through electrolysis of alkaline salts.

Commercially, a greater quantity of carbon is treated with a greater quantity of oxygen than eventually becomes carbon monoxide. Portions of these elements are consumed in preheating the carbon; the remainder produces, during the afterburning of carbon, a gaseous mixture consisting essentially of approximately ninety percent carbon monoxide and ten percent carbon dioxide. The gas produced during the preheating period is predominately carbon dioxide.

In my invention the means employed for checking reaction of carbon monoxide and steam and for removing carbon dioxide is to absorb them in caustic lime. At the prevailing temperatures of the primary reaction and below these, the affinity of steam for quicklime is greater than for carbon monoxide and that of carbon dioxide for lime greater than for ammonia.

The nitrogen for synthetic ammonia, and that used in startings for preheating, is preferably obtained by fractional preferential distillation of atmospheric air.

For obtaining alkaline cyanides, the hydrocyanic acid may be absorbed either in caustic alkali or in alkaline carbonate and lime.

In the first instance, the resultant solution is heated to remove water and the residue passed through heated coke to melt for gathering in cans.

In the latter instance, ammonia is passed through the solution to precipitate the carbonates, the solution is heated to expel ammonia, the liquid is filtered off, whereupon the same procedure as in the prior instance is followed.

In reacting carbon monoxide and ammonia, thoria or alumina or both may be used as catalysts. The preferred temperature, when thoria is used, is approximately 440° C.

It will be obvious to those skilled in the art that catalysts, suitable oxides, other than those mentioned may be found equally satisfactory in carrying out my improved process. For instance, titanium oxide will give satisfactory results as it acts very much like thoria.

Having described my invention, I claim:

1. The production of hydrocyanic acid by reaction of ammonia and carbon monoxide at a temperature between 400° and 450° centigrade, in the presence of calcium oxide, whereby secondary reactions of carbon monoxide and steam are avoided.

2. In the production of hydrocyanic acid, inducing reaction of ammonia and carbon monoxide by a suitable catalyst at temperatures between 400° and 450° centigrade, and injecting calcium oxide into the reaction atmosphere whereby secondary reactions of carbon monoxide and steam are prevented.

3. In the production of hydrocyanic acid, the process of bringing ammonia and carbon monoxide together at temperatures between 400° and 450° centigrade, in the presence of calcium oxide and a suitable catalyst, recovering the resultant calcium compounds and reconverting said compounds into oxide for re-use.

RICHARD T. SCHRAUBSTADTER.